United States Patent Office 2,847,278
Patented Aug. 12, 1958

2,847,278

PRECIPITATION OF ZIRCONIUM, NIOBIUM, AND RUTHENIUM FROM AQUEOUS SOLUTIONS

Archie S. Wilson, Richland, Wash., assignor to the United States of America as represented by the United States Atomic Energy Commission No Drawing. Application February 21, 1957
Serial No. 641,768

8 Claims. (Cl. 23—14.5)

This invention deals with the decontamination of plutonium and/or uranium solutions from fission products, and in particular from ruthenium, zirconium and niobium.

In the recovery of uranium and/or plutonium values from so-called dissolver solutions, which are solutions obtained by the dissolution of neutron-bombarded uranium in nitric acid and which in addition to uranium and plutonium contain fission products, a solvent extraction process is frequently used with, for instance, trialkyl phosphate or methyl isobutyl ketone (hexone) as the solvent.

These solvent extraction processes, however, have one disadvantage: certain types of fission products, in particular zirconium, niobium and ruthenium, are coextracted with the uranium and/or plutonium to a rather high degree so that the separation and decontamination of the uranium and plutonium from the fission products is not satisfactory.

A pretreatment process, the so-called head-end treatment, has been developed to overcome this disadvantage and to remove the three coextractable fission products prior to the extraction proper. This head-end treatment comprises the incorporation of a manganese dioxide precipitate in the dissolver solution and heating the mixture thus obtained to below boiling, whereby practically all of the zirconium and niobium but very little of the ruthenium is carried on the precipitate, while a small part of the ruthenium is deposited on the walls of the container; the bulk of the ruthenium, however, is volatilized, probably as ruthenium tetroxide.

This volatile ruthenium fraction has been difficult to handle, and it often escaped into the atmosphere; this represented a health hazard in view of the high radioactivity of this ruthenium. It has been tried to overcome this drawback by carrying out the precipitation at room temperature; however, then the decontamination from ruthenium was entirely unsatisfactory.

It is an object of this invention to provide a process of simultaneously removing zirconium, niobium and ruthenium values from an aqueous solution in which the disadvantages described above are overcome.

It is thus an object of this invention to provide a process of simultaneously removing zirconium, niobium and ruthenium values from an aqueous solution in which the volatilization of ruthenium is negligibly low.

It is also an object of this invention to provide a process of simultaneously removing zirconium, niobium and ruthenium values from an aqueous solution which operates with a high degree of efficiency.

It has been found that by adding to the solution to be treated a symmetrical water-soluble dialkyl ketone which rapidly reacts with ruthenium tetroxide or other volatile ruthenium compound, but slowly and little only with manganese dioxide, digestion of the solution after the incorporation of the manganese dioxide precipitate does not bring about volatilization of ruthenium and a great deal of ruthenium is carried on the manganese dioxide together with the zirconium and niobium values.

The process of this invention thus comprises adding a water-soluble symmetrical dialkyl ketone to an aqueous solution containing zirconium, niobium and ruthenium values, incorporating a manganese dioxide precipitate, digesting the mixture obtained thereby, and separating the manganese dioxide precipitate carrying said values from the aqueous solution.

The ketone, in order to be suitable for the process of this invention, should react slowly with the manganese dioxide but rapidly with the voltaile ruthenium compound, as has been mentioned above. Acetone and diethyl ketone were found to have these characteristics and, also on account of their being water-soluble, to be particularly well suitable. Water-soluble alcohols, asymmetrical ketones and aldehydes were found to react too rapidly with the manganese dioxide precipitate and are therefore not satisfactory.

The dialkyl ketone may be added to the aqueous solution prior to or after the incorporation of the manganese dioxide precipitate, but it should be added before the digestion which is carried out at elevated temperature when most of the ruthenium volatilization would take place otherwise.

The quantity of ketone may vary widely. For average concentrations of dissolver solutions (about 2 M in uranyl nitrate), the amount added should be at least about 1.5 percent by volume of the solution.

The manganese dioxide may either be added as a preformed compound, or else it may be precipitated right in the solution to be treated; the latter is preferred. In order to precipitate the manganese dioxide in situ, potassium permanganate and manganous nitrate solutions are added to the solution to be treated, and the mixture thus obtained is then digested at an elevated temperature, preferably at from 60 to 85° C., whereby manganese dioxide precipitates.

After the digestion period, which may range from 30 minutes to 2 hours, the solution is preferably acidified because the precipitate is difficult to separate from an an acid-deficient solution on account of its colloidal consistency. An acidity of about 0.1 M has been found to be the optimum concentration. Adjustment of the acidity to this concentration is advantageously carried out after the solution has been cooled down to room temperature. In the acidified solution the manganese dioxide carrying the contaminants becomes crystalline, and it may then be readily separated from the solution by filtration, centrifuging or decantation.

In the following, an example is given to illustrate ruthenium removal by the process of this invention but not to limit the invention to the details given therein.

*Example*

Two 290-ml. aliquots were used of a solution that had been formed by mixing 5,000 ml. of a 1.75 M uranyl nitrate solution, which was 0.3 M nitric-acid-deficient [1] and 0.013 M in manganous nitrate, and 10 ml. of a dissolver solution (obtained by dissolution of a neutron-bombarded uranium body in nitric acid).

To one aliquot there was then added 1.7 percent by volume of chemically pure acetone, while the other aliquot was processed as was, without this addition.

---

[1] Acid-deficient solutions are not alkaline solutions. They are solutions in which the excess acid and part of the acidity resulting from hydrolysis of the salts present have been neutralized, for instance, with alkali metal hydroxide. A 0.2-M-acid-deficient solution, for instance, is a solution to which alkali metal hydroxide has been added in a quantity sufficient to neutralize all of the excess acid and 0.2 M of the acid derived from hydrolysis of the salt. Acid-deficient solutions are still acid solutions; a 0.2 M acid-deficient nitrate-containing solution, for instance, usually has a pH value of about 1.5 for a solution about 2 M in uranyl nitrate.

The procedure, with the exception of the acetone addition, was the same for both samples.

The samples were then heated to 65° C. whereupon 20 ml. of an aqueous solution 0.2 M in sodium hydroxide and 0.1 M in potassium permanganate was added thereto. Both solutions were then held, "digested," at this temperature of 65° C. for one hour.

Thereafter the solutions were cooled to room temperature and made 0.12 M in excess nitric acid. During the heating and digestion period the reaction vessel was provided with a vapor trap consisting of several layers of tissue paper for condensation of any volatilized matter. The contents of radioactive ruthenium which collected on said vapor trap, that in the manganese dioxide precipitate, and that in the remaining aqueous solution were measured. It was found that no radioactive ruthenium had passed through the vapor trap. The results are given in the table below.

|  | Percent of Ru Activity | |
|---|---|---|
|  | No Acetone Added | 1.7 vol. Percent Acetone Added |
| Condensate in vapor trap | 6.5 | 0.64 |
| MnO$_2$ precipitate | 59.0 | 48.2 |
| Aqueous solution | 28.2 | 46.4 |
| Total (material balance) | 93.7 | 95.2 |

The above results show that volatilization of ruthenium was decreased by a factor of 10 when acetone was added to the solution. The aqueous solution was practically free from niobium and zirconium while the manganese dioxide precipitate contained the bulk of these two fission products.

Similarly good results were obtained when the acetone was replaced by diethyl ketone.

The process of this invention is particularly well suitable for a preparatory treatment of dissolver solutions prior to uranium and plutonium recovery therefrom by solvent extraction. However, it is also suitable for any other purposes where removal of radioactive ruthenium is desirable without substantial volatilization.

Zirconium, niobium and ruthenium compounds have various types of utility. Ruthenium compounds, for instance, are useful as catalysts in chemical processes. Ruthenium chloride is employed for medicinal purposes. Furthermore, elemental ruthenium has been widely used as an ingredient of alloys. Similarly, zirconium is an essential component of corrosion-resistant alloys for construction materials, for instance in the chemical industry, and niobium is a valuable component of special steels. Furthermore, separation of ruthenium, zirconium and niobium brings about decontamination of uranium and plutonium and thereby regeneration of these two metals for re-use as fuel material in nuclear reactors.

The conversion of the extracted and/or precipitated ruthenium compounds and of the extracted zirconium and niobium compounds to the compounds having the utility just described is not part of the invention, and the methods suitable therefor are known to those skilled in the art.

It will be understood that this invention is not to be limited to the details given herein, but that it may be modified within the scope of the appended claims.

What is claimed is:

1. A process of simultaneously removing zirconium, niobium and ruthenium values from an aqueous nitric acid solution without substantial volatilization of ruthenium, comprising adding a water-soluble symmetrical lower dialkyl ketone to said solution, incorporating a manganese dioxide precipitate into said solution whereby zirconium, niobium and ruthenium values are carried on said precipitate, and separating said precipitate from said aqueous solution.

2. The process of claim 1 wherein the ketone is acetone.

3. The process of claim 1 wherein the ketone is diethyl ketone.

4. The process of claim 1 wherein the ketone is added at least in an amount of 1.5 per cent by volume of the solution.

5. The process of claim 1 wherein incorporation of manganese dioxide is accomplished by adding a solution of potassium permanganate and of manganous nitrate to the solution to be treated whereby the precipitate forms in situ.

6. The process of claim 5 wherein the solution is digested for from 30 minutes to 2 hours at a temperature of between 60 and 85° C. after the addition of the permanganate and manganous nitrate.

7. The process of claim 6 wherein the mixture is cooled to room temperature after digestion and the acidity is then adjusted to about 1 M.

8. A process of simultaneously removing zirconium, niobium and ruthenium values from an aqueous nitric acid solution containing said values together with at least one metal selected from the group consisting of uranium and plutonium, comprising adding a water-soluble symmetrical lower dialkyl ketone to said solution, incorporating a manganese dioxide precipitate into said solution whereby zirconium, niobium and ruthenium values are carried on said precipitate while said uranium and plutonium values remain in solution, and separating said precipitate from said aqueous solution.

References Cited in the file of this patent

UNITED STATES PATENTS 2,796,424    Schulz et al. _____ June 18, 1957

OTHER REFERENCES

Coryell et al.: "Radiochemical Studies: The Fission Products," Book I, Paper 14 to Gest et al., pages 170–175 (1951); Book III, Paper 254 to Glendenin et al., pages 1529–1531 (1951). National Nuclear Energy Series, Div. IV, vol. 9, published by McGraw-Hill Book Co., Inc., New York City.